Oct. 14, 1969     B. A. FOUNTAIN ET AL     3,472,474

APPARATUS FOR SLIDEABLY SUPPORTING AN INSULATING PIPE

Original Filed Nov. 25, 1966

INVENTORS
BRUCE A. FOUNTAIN
NEIL E. JOHNSON
WILLIAM C. TURNER

BY
ATTORNEY

United States Patent Office 3,472,474
Patented Oct. 14, 1969

3,472,474
APPARATUS FOR SLIDEABLY SUPPORTING
AN INSULATING PIPE
Bruce A. Fountain, Flossmoor, Ill., Neil E. Johnson, New Monmouth, N.J., and William C. Turner, South Charleston, W. Va., assignors to Union Carbide Corporation, a corporation of New York
Continuation of application Ser. No. 596,918, Nov. 25, 1966. This application Oct. 28, 1968, Ser. No. 771,692
Int. Cl. F16l 3/16
U.S. Cl. 248—55       10 Claims

ABSTRACT OF THE DISCLOSURE

A slideable pipe support apparatus is provided which includes a first plate member having an arcuately depressed upper surface adapted to receive a pipe and at least one upwardly inclined slot extending therethrough which is adapted to hold a strap for affixing the supported pipe to the first plate member, and a second plate member having a surface adapted to be in slideable contact with the first plate member and another surface adapted to be in contact with a structural support means.

---

This application is continuation of Ser. No. 596,918 filed Nov. 25, 1966, and now abandoned.

This invention relates to an improved pipe support apparatus and, more particularly, it concerns a means of attaching a slideable carbon or graphite pipe support to an insulated pipe.

In many important commercial processes piping is used to transport various liquids, gases and even solids from one point to another. Oftentimes the media being transported is either hot or cold, i.e., it is not at ambient temperature. In order to minimize the loss or gain of thermal energy, as the case may be, to the enveloping environment it is common practice in the industry to surround the pipe with a thermal insulant or barrier material.

In use, piping of the before-described type is usually mounted on beams or fixtures. Subsequently, when the so-mounted piping experiences either water hammer, thermal expansion, thermal contraction, or pumping pulsations, its protective insulating covering is rapidly abraded away due to the fact that the piping is moved by these phenomena both laterally and axially over these support beams or fixtures.

Accordingly, it is the principal object of the invention to provide a means of mounting an insulated pipe on a fixture or beam whereby the pipe may move both axially and laterally without the insulating cover of the pipe being subjected to abrasive forces.

Another object of the invention is to provide a means of connecting a slideable pipe support to an insulated pipe.

With the foregoing and other objects in mind, the invention will now be described in greater particularity and with reference to the drawing wherein.

Figure 1:
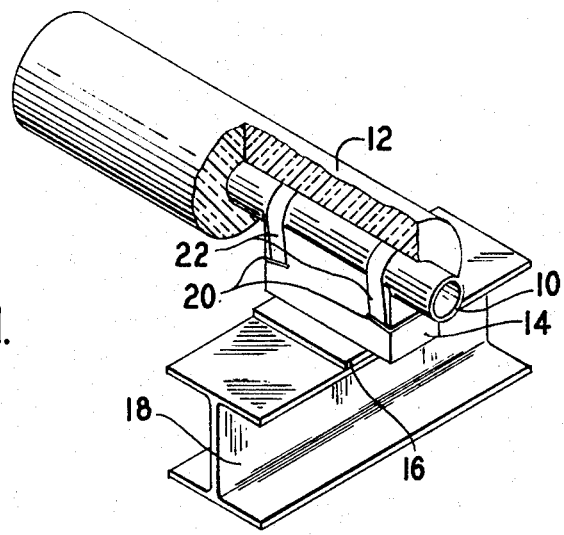
FIGURE 1 is an isometric view illustrating a pipe support apparatus of the invention in place between a supported pipe and a structural beam member.

Referring to FIGURE 1 of the drawing, there is shown a section of pipe 10 having an insulating cover 12 resting upon and in contiguous contact with a generally rectangular shaped first plate member 14 of a pipe support assembly. The first plate member 14 rests slideably upon a second plate member 16 of the pipe support assembly.

The second plate member 16 is disposed in contiguous surface-to-surface contact with a structural beam member 18, which for the purposes of illustration here is shown as a section of a conventionally rolled I beam. The first plate member 14 is provided with upwardly inclined slots 20 which are adapted to receive and hold the straps 22 which fixedly attach the first plate member 14 to the pipe 10. The first plate member has an arcuately depressed top surface, a flat bottom surface, two side walls and two end walls.

Figure 2:
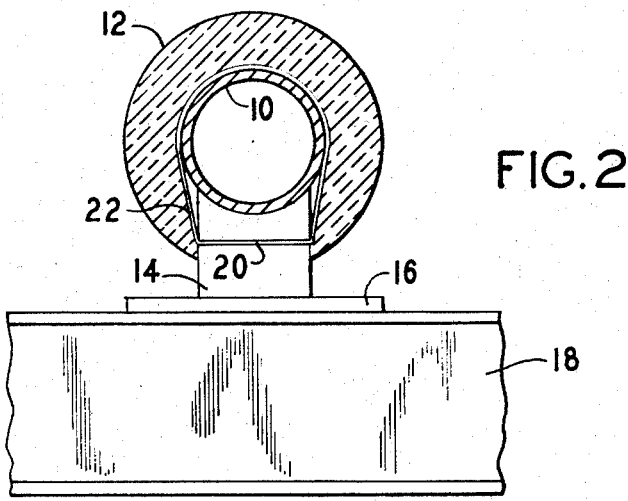
FIGURE 2 is an end view of the pipe support apparatus of the invention shown in FIGURE 1.

FIGURE 2 of the drawing shows an end view of the pipe support apparatus of the invention. The first plate member 14 is provided with an accurate depression at its pipe contacting surface, formed to accommodate the outside diameter of the pipe which is supported. The insulation 12 surrounding the pipe 10 is cut away so that the pipe is in direct contact with the first plate member 14. The structural beam contacting surface of the second plate member 16 is generally a flat surface but may be varied in configuration to suit particular requirements. The second member 16 may or may not be adhesively connetced to the structural beam member 18, as is desired. The sliding action to provide for free pipe movement takes place, of course, at the interface defined between the two plate members 14 and 16, respectively.

Figure 3:
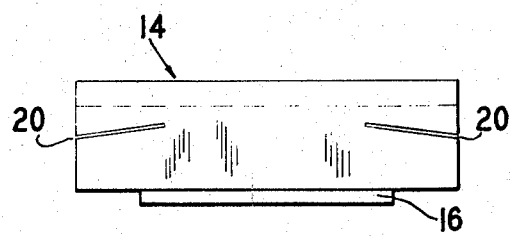
FIGURE 3 is a front elevational view of the pipe support of the invention.

FIGURE 3 is a front elevational view of the pipe support assembly of the invention. The first plate member 14 is provided with upwardly inclined slots 20 which are designed to receive and hold the straps used to affix the pipe to the first plate member of the pipe support assembly.

After a series of experiments, it was discovered that the upwardly inclined slot must be at an angle in the range of from about 1° to about 45°. This angle of inclination is the angle formed between an imaginary line drawn perpendicular to the end wall of the pipe support member at the point where the line generated by the floor of the slot intersects the end wall of the pipe support and the line formed by the floor of the slot itself (as shown in FIGURE 3).

It should be noted that if the angle of the slot is too small any strap inserted therein for affixing the support member to a pipe tends to work its way out in use as the pipe is moved both axially and vertically by such phenomenon as water hammer, thermal expansion or contraction, pumping pulsations, vibrations and the like; if it is too large the support member has a tendency to fracture due to the "notching effect" caused by the slot.

In constructing an apparatus of the before-described type, it is common practice to fabricate the first and second plate members from a species of carbon although other materials of construction such as asbestos and polymerized fluorocarbons may also be utilized. Carbon is meant to include all the forms of carbon now commercially available, i.e., it is meant to include amorphous carbon, graphic carbon and mixtures thereof. When carbon is employed as the material of construction, the preferred slot angle is between 3° to 5°. The use of this slot angle results in a first plate member which is exceptionally strong and not subject to chipping or cracking due to the "notching effect" caused by the slot.

The foregoing disclosure is posed for illustrative purposes only and there is intended here no unwarranted restrictions or limitations on the apparatus of this invention, and it should be considered that in light of this disclosure numerous alternative embodiments within the spirit of the invention suggest themselves to those persons familiar with the art. The intended limitations, therefore, are those stated in the appended claims.

What is claimed is:
1. In a slideable pipe support apparatus including:
(a) a first plate member having a first flat surface adapted to move slideably over a juxtapositioned surface, a second arcuately depressed surface adapted to be in contact with a supported pipe, two side walls and two end walls;

(b) a second plate member having a first surface adapted to be in slideable contact with said first surface of said first plate member and a second surface adapted to be in contact with a structural means adapted to bear a load imposed thereon by said pipe and said slideable support; the improvement which comprises:

(c) said first plate member having a slot extending therethrough positioned below said arcuately depressed surface which is upwardly inclined from one side wall of said first plate member toward said arcuately depressed surface at an angle of from 1 to 45 degrees, said slot being adapted to receive and hold a strap for affixing said first plate member to said supported pipe.

2. The slideable pipe support apparatus of claim 1 wherein said first and second plate members consist essentially of carbon.

3. The slideable pipe support apparatus of claim 1 wherein said supported pipe is provided with an insulating cover.

4. The slideable pipe support apparatus of claim 2 wherein the angle of said slot is from 3 to 5 degrees.

5. The slideable pipe support apparatus of claim 3 wherein said first and second plate members consist essentially of carbon.

6. The slideable pipe support apparatus of claim 1 wherein said first plate member has a second slot extending therethrough positioned below said arcuately depressed surface which is upwardly inclined from the second side wall of said first plate member toward said arcuately depressed surface at an angle of from 1 to 45 degrees, said slot being adapted to receive and hold a strap for affixing said first plate member to said supported pipe.

7. The slideable pipe support apparatus of claim 6 wherein said first and second plate members consist essentially of carbon.

8. The slideable pipe support apparatus of claim 6 wherein said supported pipe is provided with an insulating cover.

9. The slideable pipe support apparatus of claim 7 wherein the angle of the slots is from 3 to 5 degrees.

10. The slideable pipe support apparatus of claim 8 wherein said first and second plate members consist essentially of carbon.

References Cited

UNITED STATES PATENTS

| | | | |
|---|---|---|---|
| 1,341,113 | 5/1920 | Dottl | 248—74 |
| 2,812,756 | 11/1957 | Myers | 248—231 X |
| 3,241,800 | 3/1966 | Richter | 248—231 |
| 3,315,927 | 4/1967 | Malloy | 248—55 |

CHANCELLOR E. HARRIS, Primary Examiner

U.S. Cl. X.R.

248—65, 231